United States Patent
Trovato et al.

(10) Patent No.: US 6,445,306 B1
(45) Date of Patent: Sep. 3, 2002

(54) REMOTE CONTROL PROGRAM SELECTION BY GENRE

(75) Inventors: Karen I. Trovato, Putnam Valley, NY (US); Paul Rankin, Surrey (GB); Daniel Pelletier, Cortlandt Manor, NY (US); Jacquelyn Annette Martino, Cold Spring; Carolyn Christine Ramsey, Pleasantville, both of NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/282,319

(22) Filed: Mar. 31, 1999

(51) Int. Cl.[7] ............................................... G05B 19/02
(52) U.S. Cl. ........................... 340/825.24; 340/825.69; 340/825.72; 348/734; 455/140; 455/151.2; 455/352; 725/38; 725/40
(58) Field of Search ....................... 340/825.24, 825.69, 340/825.72; 725/38, 40; 348/563, 565, 734; 455/140, 151.2, 352

(56) References Cited

U.S. PATENT DOCUMENTS

| | | | |
|---|---|---|---|
| 5,210,611 A | 5/1993 | Yee et al. | 348/473 |
| 5,251,034 A * | 10/1993 | Na | 348/565 |
| 5,317,403 A * | 5/1994 | Keenan | 725/38 |
| 5,673,089 A * | 9/1997 | Yuen et al. | 725/38 |

FOREIGN PATENT DOCUMENTS

| | | | |
|---|---|---|---|
| EP | 0854645 A2 | 1/1998 | H04N/5/445 |
| EP | 0849954 A2 | 6/1998 | H04N/7/58 |
| JP | 07264574 | 3/1994 | H04N/7/173 |
| WO | WO9619074 | 6/1996 | H04N/5/445 |
| WO | WO9856176 | 12/1998 | H04N/7/08 |
| WO | WO9913643 | 3/1999 | H04N/7/08 |

* cited by examiner

*Primary Examiner*—Brian Zimmerman
*Assistant Examiner*—Yves Dalencourt
(74) *Attorney, Agent, or Firm*—Edward W. Goodman

(57) ABSTRACT

A remote control system in which a program-up or program-down activation on a control remote device effects the selection of the next or prior available channel that is likely to contain a program of a particular selected genre, or category. The system includes an identification of those programs that are likely to relate to each particular category. When the user selects a category, the user incrementally selects from the programs contained within the selected category. In the system, a list builder includes a number of capabilities for improving the selective quality of the program selection, having access, for example, to an information source that provides the time of each scheduled program on each channel, and an indication of each program's genre, rating, and other related items.

21 Claims, 7 Drawing Sheets

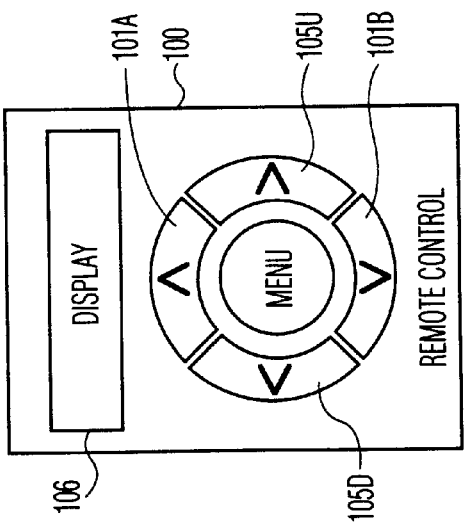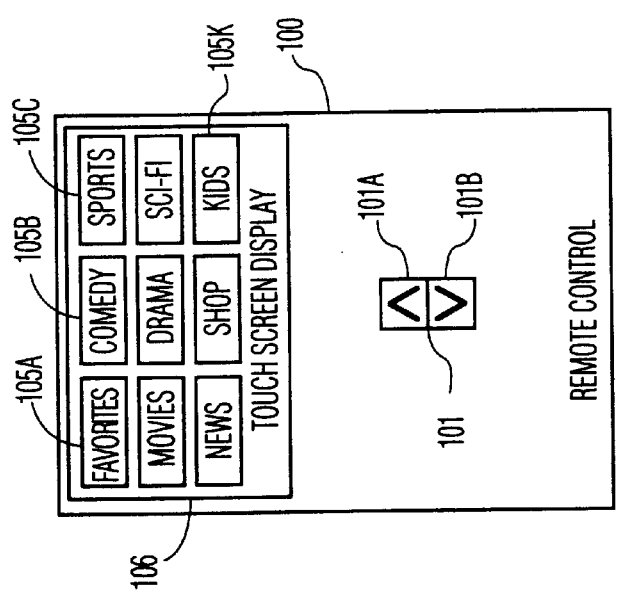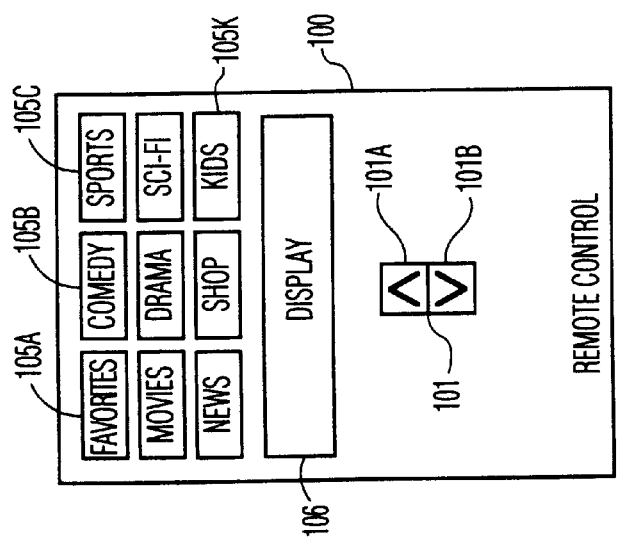

REMOTE CONTROL PROGRAM SELECTION BY GENRE

BACKGROUND OF THE INVENTION

1. Field of the Invention

This invention relates to the field of consumer electronics, and in particular, to the remote control of electronic devices.

2. Description of the Related Art

Remote control devices for electronic equipment are common in the art. A remote control device includes means for controlling each of the functions of the equipment being controlled. If the equipment being controlled allows for the selection among a variety of channels, the remote control device typically includes a control to select a particular channel, as well as a channel-up and a channel-down control to allow for an incremental selection of the channels. Such remote control devices typically communicate an "increment channel" or "decrement channel" command to the equipment being controlled. In response to the received command, the equipment being controlled selects the next channel above or below the current channel. In many cases, the equipment being controlled also includes an ability to skip one or more channels, based upon the quality of the received signal at each channel, or based upon a user's preference. That is, for example, television channels 2, 4, 5, 7, 9, 11, and 13 may be the channels associated with a particular area; if the currently tuned channel is channel 5, an increment command results in a change to channel 7, and a decrement command results in a change to channel 4. In like manner, channels 2, 3, 4, 5, etc., may be available, but channels 2 and 3 may be the same network transmitting in alternative local areas. The user may program the equipment being controlled to skip either channel 2 or channel 3, depending upon the user's preference of local area coverage.

With over a hundred television channels typically available to most users, and the prediction of hundreds of television channels being provided in the near future, the feasibility of scanning for a program of interest via a channel increment/decrement process is questionable, at best. A user may program the remote control device or the equipment being controlled to exclude channels of little or no interest, such as channels that transmit in a different language than that of the user, channels that exclusively deal with topics of little or no interest to the user, and so on. Such a process of identifying channels of disinterest, and by implication, channels of interest, eases the program selection process somewhat, by reducing the number of channels being scanned. This process, however, is only effective for removing those channels that the user can determine will never broadcast a program of interest to this user. In most cases, this process still results in a large number of channels being of potential interest to the user.

The deficiency of the available methods of incremental channel scanning methods is primarily related to the fact that such methods are based upon the numeric designation of the channels, whereas the numeric designation has no bearing or correlation to the user's desires. A user may wish to scan every channel that has not been expressly excluded, in which case, a scan by numeric designation may be an effective technique. In many cases, however, the user would prefer to scan only those channels that are broadcasting programs of interest to the user at the time that the user is scanning. That is, if the user is in the mood for comic relaxation, the user would prefer to incrementally scan only those channels that are currently broadcasting a comedic program; at other times, the user may prefer to scan only those channels that are broadcasting a news program; and so on. In these scenarios, the numeric designation of the channel is irrelevant to the task of providing programs having a particular topic, or genre.

The reliance on numerical channel designations or network identifiers is further reflected in program guides that are conventionally presented in the order of channel number or network identifier. On-screen program guides are particularly inefficient for finding programs of interest that may have significantly different channel numbers, and a significant portion of the available display area is devoted to the display of each channel number and each network identifier, to facilitate the entry of the channel number corresponding to the user's selection, or the incremental stepping to the desired channel number. As noted above, the numeric designation of the channel is irrelevant to the task of selecting a desired program, but required for conventional channel selection to reach the desired program.

Therefore, a need exists for a device or process that allows a user to easily scan programs based upon the user's current interests. A need also exists for a device or process that allows the user to easily select a program based on available program information.

SUMMARY OF THE INVENTION

The invention provides a device and process that allows a user to select a particular topic or genre of interest, and then to incrementally scan the currently available programs that are likely to be of that topic or genre. A channel-up or channel-down activation on a control remote device effects the selection of the next or prior available channel that is likely to contain a program of a particular selected genre, or category. The invention includes an identification of the programs that are likely to relate to each particular category. When the user selects a category, the user is provided a means for incrementally selecting each program contained within the selected category; the channel number associated with the selected program is automatically determined, and the display device is tuned to that channel number.

The invention also includes the display of program information to aid the user in the selection process. The user is provided the option of selecting a program from among the displayed program information directly, without the need for explicitly selecting a channel number. The displayed program information may include images, thereby facilitating a program selection without relying solely upon program name recognition. The displayed program information may also include text, animation, audio, and links to other sources of information.

The invention includes a list builder that creates a number of different lists, each list containing an identification of programs that are likely to relate to each particular topic or genre. When the user selects a topic or genre, the appropriate list is accessed, and the user is provided a means for incrementally selecting the programs contained in the selected list. In a preferred embodiment, the list builder includes a number of capabilities for improving the selective quality of the lists, having access, for example, to an information source that provides the time of each scheduled program on each channel, and an indication of each program's topic or genre. In like manner, the creation of the lists or the selection of the appropriate list are enhanced and improved based upon expressed and implied preferences that are determined, for example, by a history of the user's past selections and/or past rejections.

BRIEF DESCRIPTION OF THE DRAWINGS

The invention is explained in further detail, and by way of example, with reference to the accompanying drawings wherein:

FIGS. 2A, 2B, and 2C illustrate alternative example remote control devices in accordance with this invention;

DESCRIPTION OF THE PREFERRED EMBODIMENTS

Figure 1:
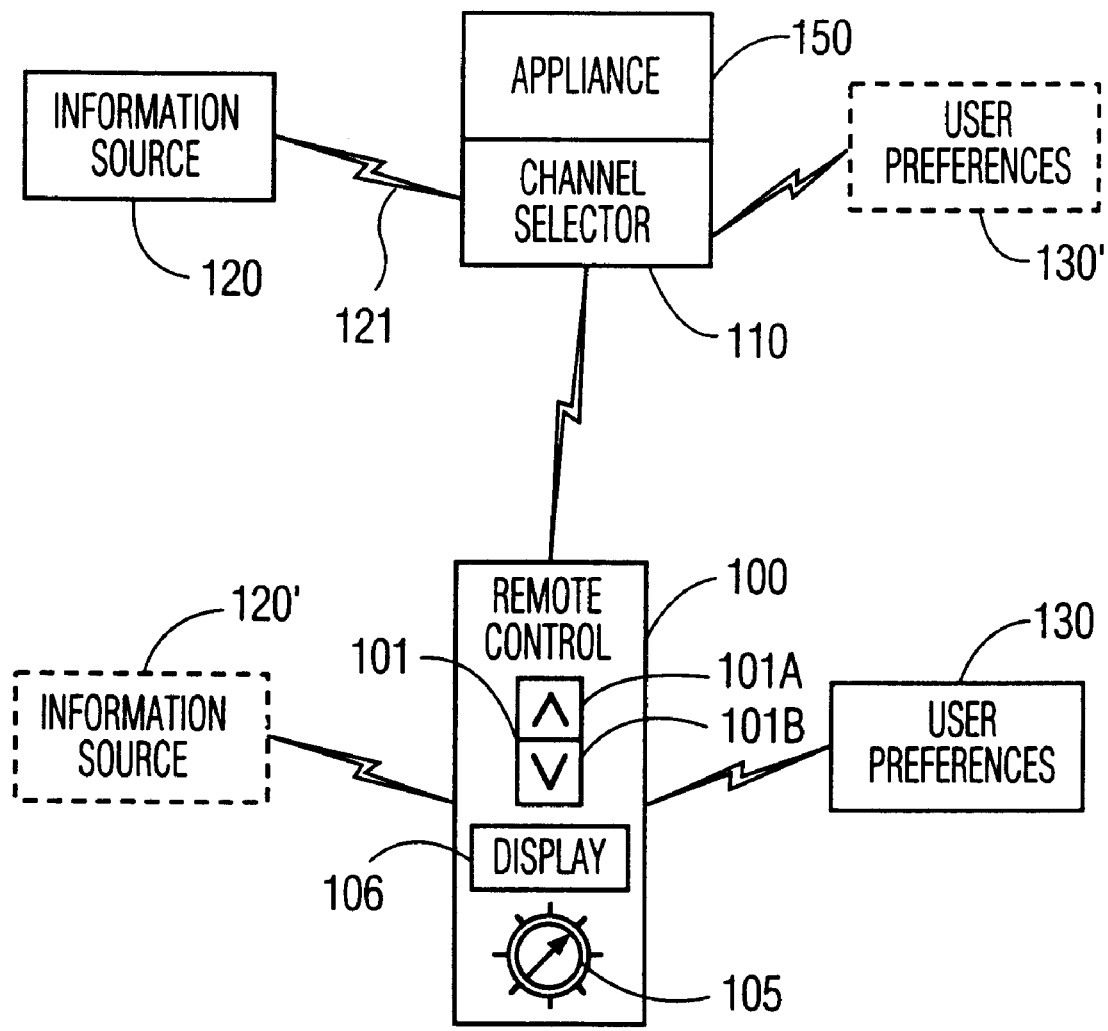
FIG. 1 illustrates an example remote control system in accordance with this invention.

FIG. 1 illustrates an example remote control system comprising a remote control 100 and a corresponding channel selector 110. In a preferred embodiment, the remote control 100 includes buttons and switches that correspond to functions available on the equipment being controlled, similar to conventional remote control devices. For ease of reference, the equipment being controlled is termed herein as an appliance 150. The appliance 150 may be, for example, a television, a video cassette recorder, a radio, a CD player, and so on. For ease of understanding, only those switches and other features of the remote control 100 that are relevant to this invention are illustrated in FIG. 1. It is assumed herein that the appliance has at least one selection option that can be controlled via an incremental "up" control and an incremental "down" control. Because one of the most common applications of a remote control system is the selection of a channel to view on a television appliance, the term channel is used herein to define the selection item on the device being controlled. Conversely, the term program is used herein to define the selection of the content material located at a particular channel. As would be evident to one of ordinary skill in the art, other appliances are included herein within the definitions of channel and program selection option. For example, a collection of music CDs may be ordered as CD1, CD2, CD3, etc. For the purposes of this invention, these CDs are selectable as "the CD on channel 1", "the CD on channel 2", and so on. In like manner, each song on each CD may be referenced by a unique channel number, and the "up" and "down" channel controls will correspond to a "next" song and "prior" song on the CD, respectively. The songs themselves, in the context of this specification, are programs; and the "up" and "down" program controls will correspond to a "next" and "prior" song that are not necessarily adjacent to the current song on the CD. In a video cassette recorder, or other recording or playback device, the term "channel" corresponds to an index to a location at which to locate a program. Selecting a channel on such a device has a similar effect as selecting a channel on a television, and is interpreted herein to mean: go to that channel (indexed location) and provide the program found there.

The remote control 100 includes an up-control 101A and a down-control 101B. For ease of reference, these controls are termed an increment control 101, wherein the direction (up or down) of each incremental change is determined by whether the up-control 101A or the down-control 101B is activated. Activation of the increment control 101 effects a change of program at the appliance 150, via the channel selector 110.

In accordance with this invention, the remote control 100 includes a selector 105 that determines the effect of subsequent activations of the increment control 101. That is, for example, if the remote control 100 is used for television program selection, the alternative switch positions of the selector 105 may correspond to "comedy", "news", "drama", "movies", and "all". If the selector 105 is in the "comedy" position, the increment control 101 will effect an incremental selection among those television channels that are likely to be broadcasting comedic programs. If the selector 105 is in the "movies" position, the incremental control 101 will effect an incremental selection among those television channels that are likely to be broadcasting a movie program. If the remote control 100 is used for music selections from a CD or radio, the alternative switch positions of the selector 105 may correspond to "classics", "jazz", "rock", "country", and so on. If the selector 105 is in the "classics" position, the activation of the increment control 101 effects the selection of the next or prior "classic" song or "classic" CD, or tunes the radio to the next channel, or station, that is likely to be playing "classic" music. The different switch positions of the selector 105 may correspond to different genre, different ratings, different topics, different users, and the like. For ease of reference, the term "category" is used hereinafter to identify a classification of the program, regardless of the type of classification; a category may be a genre, a rating, a topic, a recommendation, or any other means of grouping or segregating programs.

Optionally, the remote control 100 may contain a display 106 that is used to display the category corresponding to the current position of the selector 105. The display may also be used for other tasks, for example, to display the title of the selection corresponding to an activation of the increment control 101, or to display status messages and the like. In an alternative embodiment, this display information is displayed on the user's appliance 150 or other display device immediately after each activation of the increment control 101 and selector 105, and is discussed further with regard to FIGS. 6 and 7.

Although the selector 105 is illustrated as a rotary dial in FIG. 1, it would be evident to one of ordinary skill in the art that other selection means may be employed, as illustrated by the example embodiments illustrated in FIGS. 2A, 2B, and 2C. For consistency and ease of understanding, the same reference numerals of FIG. 1 are used in FIGS. 2A, 2B, and 2C for items serving a similar function to those presented in FIG. 1. In FIGS. 2A and 2B, discrete selection buttons 105A, 105B, 105C, etc., are provided for each category. In FIG. 2A, the selection buttons are conventional switches, whereas in FIG. 2B, the selection buttons are regions of a touch sensitive pad or touch sensitive display 106. The use of discrete selections allows for multi-category selections. In a preferred embodiment, the selection of multiple categories results in a selection of the union ("or") of the selected categories, although an alternative embodiment results in a selection of the intersection ("and") of the selected categories. In another preferred embodiment, the user is given the option of selecting the effect (union or intersection) of a multi-category selection. A reset button (not shown) is provided to clear the selections. Some category selections may implicitly contain multiple category selections; for example, the "Kids" 105K category may be structured to select only those programs that have a "G" rating and which include any of the other categories except news or shopping.

In a preferred embodiment, the selected categories are indicated on the remote device 100, via, for example, the use of lighted switches 105A, 105B, etc. in FIG. 2A, and highlighted selections 105A, 105B, etc. on the display 106 in FIG. 2B. To assure consistency between the remote device 100 and the channel selector 110, the lighting or highlighting of the selected categories is effected based on acknowledgment feedback from the channel selector 110. In an embodiment that allows for the exclusion of categories as well as the inclusion of categories, for example, comedy but not sports, different color lights or different highlighting effects are used.

FIG. 2C illustrates an alternative example embodiment wherein the selection of a category is effected by the use of increment 105U and decrement 105D switches on the remote. The display 106 displays the selected category name; in an alternative embodiment having a sufficiently large display 106, or a display on the appliance 150, the available categories are also displayed. The selector 105 may also be implemented using existing buttons and switches on the remote control 100, for example, after entering a category-select mode. Consistent with conventional remote control technology, the selection of one or more categories may also be effected via an on-screen menu displayed at the appliance 150, or on the local display 106, thereby eliminating the need for an explicit selector 105 switch.

In order to select channels within each category, information must be provided to establish a correspondence between the category and the available channels. For example, to select the "next comedy program", information must be provided that identifies those channels that currently contain, or are likely to contain, comedic program. The information source may be the user, who creates a list, or program, of programs and channels corresponding to each category. For example, a user may categorize each CD in his or her music collection. The information source may be included with the material being provided to the appliance 150. For example, each CD may include an indication of the category of the CD, or the category of each song on the CD, or each broadcast television program may include an indication of one or more categories associated with the program. The information source may be created by a separate process, such as a categorization process that categorizes programs as they are recorded to a recording device for subsequent selective playback. The information source may be external, and may provide time dependent information, such as the schedule of broadcast programs from each television channel. In this case, the categorization is based upon the schedule, eliminating the need to extract the current category information from the channel directly. In a preferred embodiment, an electronic program guide, common in the art, is used to maintain a current categorization of each channel, based upon the contents of the guide, including, for example, each program's title, genre, rating, and so on. As would be evident to one of ordinary skill in the art, the information source may be accessed in a variety of means, including, for example, via an Internet connection to the Worldwide Web, or via a transmitted encoding, such as Teletext.

Figure 3:
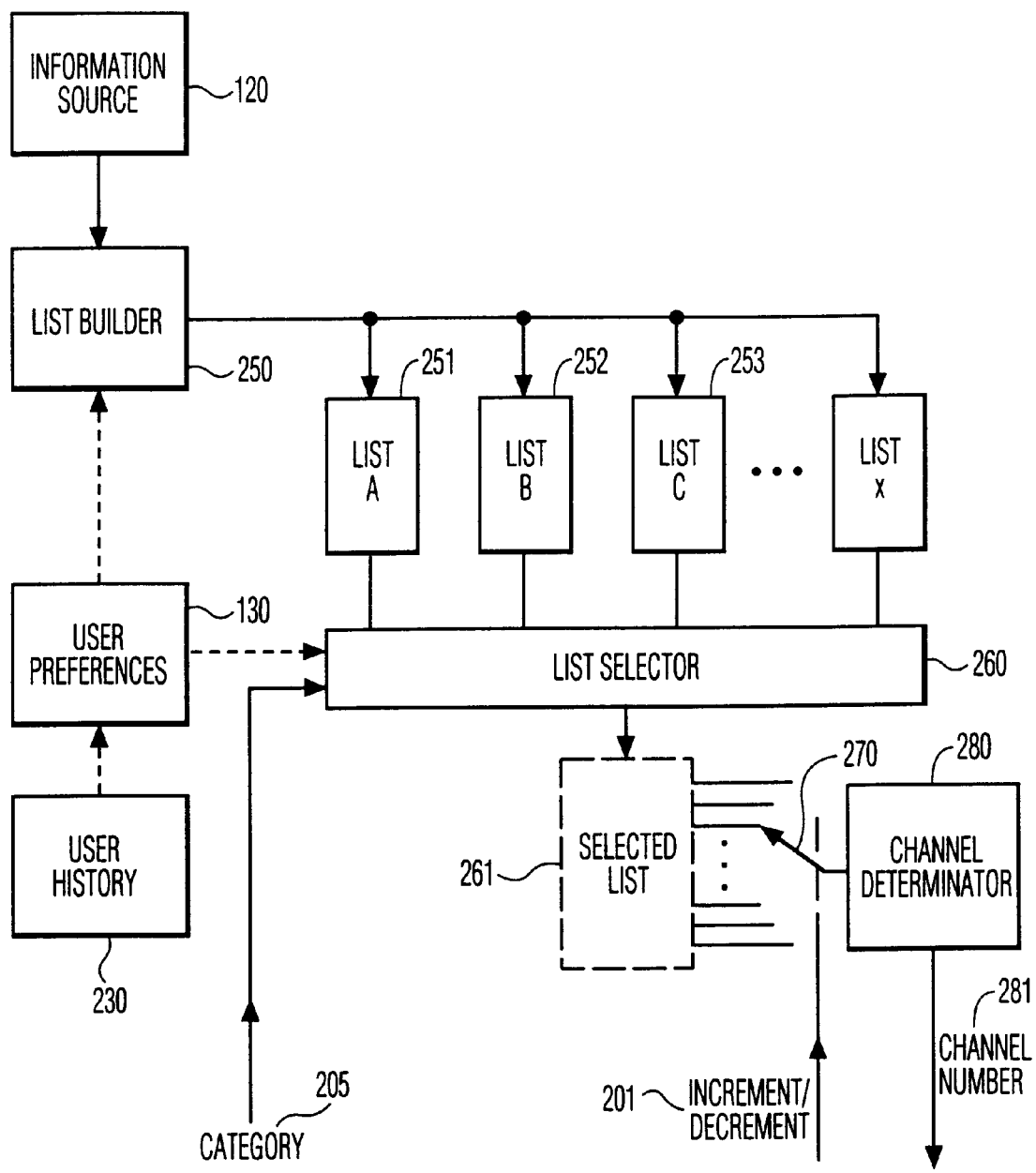
FIG. 3 illustrates an example program selection system in accordance with this invention.

FIG. 3 illustrates an example program selection system that includes a list builder 250, list selector 260, channel switch 270, and channel determinator 280. The list builder 250 receives information from the information source 120 regarding the available channels and programs and creates lists 251, 252, 253, . . . , of available programs corresponding to each category. As mentioned above, the information source 120 may include time-dependent information. Because techniques are commonly available for processing time-dependent data, the lists 251, 252, 253, etc., are presented herein as lists of the current programs within each category, for ease of understanding. That is, for example, the list builder will have access to a real-time clock, and will continually update the lists to reflect the programs in each category that are scheduled to be broadcast at the current time, or within some time span of the current time. As noted above, the same program may be listed in multiple lists. A PG-rated comedy movie would be included, for example, in each list of example categories "PG", "comedy", and "movie". This movie would be added to each list at some time prior to its scheduled broadcast time, and removed from each list at its scheduled ending time. The entry in each list includes, as a minimum, the channel number associated with each program. In a preferred embodiment, the entry also includes ancillary information such as the title of the program, its start time and duration, and its rating. This ancillary information is displayed for a short time period on the appliance 150 or the display 106 when the user initially selects the program. As discussed further with regard to FIGS. 6 and 7, the ancillary information may also contain other information, including associated images, animations, links to other sources of information, and the like.

When the user communicates a category selection command 205, by switching, for example, the selector 105, the list selector 260 provides the selected list 261 from the available lists 251, 252, 253, . . . , to the channel switch 270. The selected list 261 is illustrated in FIG. 3 in dashed lines, indicating that in a preferred embodiment, the list selector 260 provides a communications path to the selected list, rather than copying the selected list into another physical list 261. Alternative embodiments would be evident to one of ordinary skill in the art. For example, the category selection command 205 may allow for boolean operations, such as "comedy and movie, but not musical". Upon receipt of this selection command 205, the list selector 260 will create a new list 261 which contains programs that appear in both the comedy and movie category lists, and which do not appear in the musical category list.

When the user communicates an increment or decrement command 201, by activating, for example, the increment control 101, the channel switch 270 accesses the entry in the selected list that is immediately above or below the entry at the current switch 270 position. The channel determinator 280 determines the channel number 281 corresponding to the selected entry and communicates this number to the appliance 150 to effect the selection of this channel. In this manner, in accordance with this invention, programs that are currently available within a selected category can be scanned through the use of an increment control 101, without having to scan programs that are not within the selected category. The channel determinator 280 may merely extract a channel number 281 from the entry in the list. Alternatively, if the entry in the list contains a network identifier, such as NBC, CNN, and so on, the channel determinator 280 also includes a transformation table for transforming the network identifier to a channel number 281 for use by the appliance 150.

As would be evident to one of ordinary skill in the art, the functional blocks of FIG. 3 may be located in the channel selector 110, in the remote control 100, or distributed between the channel selector 110 and the remote control 100. In one embodiment, for example, the list builder 250, the lists 251, 252, 253, . . . , the list selector 260, and the channel switch 270 are located in the channel selector 110. The category command 205 and the increment/decrement commands 201 are communicated from the remote device 100, and the channel selector 110 effects the appropriate selection of channels from the selected list. In an alternative embodiment, as illustrated in FIG. 1 by the information source 120', the remote control receives the program information directly. The list builder 250, the lists 251, 252, 253, . . . , the list selector 260, and the channel switch 270 are located in the remote control 100. When the user enters a category command 205, the remote control 100 effects the selection of the selected list. When the user enters an increment/decrement command 201, the remote control 100 extracts the next or prior channel number from the selected list and communicates the channel number directly to the channel selector 110, equivalent to the user explicitly entering this channel number on a conventional remote control 100. Other embodiments would be evident to one of ordinary skill in the art. For example, the list builder may be located on a personal computer or set-top box with access to the Internet or other sources of data, and the channel selector 110 or remote control 100 may be configured to receive the created lists 251, 252, 253, from this personal computer or set-top box.

In accordance with another aspect of this invention, the list creation and list selection processes are enhanced by the use of user preferences 130. These preferences may be expressed or implied, using, for example, a history of the user's prior selections 230 to form a basis for subsequent selections. In a straightforward embodiment, each program is given a preference weight. When a user views a significant portion of a program, that program's weight is increased. In like manner, the program's weight is decreased in dependence upon the time duration since the last viewing of that program, if any. New programs are given an initial preference weight based on a composite of the preference weights of similarly categorized programs. Entries are placed in the list in a sorted order, based upon each program's preference weighting. In another example embodiment, the user expressly identifies preferred channels, and programs on these channels in a category list are always presented before other channels in that category list. In another preferred embodiment, the remote control system is "preprogrammed" with one or more default stereotypical profiles that include weights based on demographics, program popularity ratings, and other factors.

In a preferred embodiment, user preferences 130 and prior user history 230 are also be used to form a user profile that contains information regarding the user's typical viewing habits. This profile is used to automatically change the category selection, thereby anticipating the user's desires. This profile also allows the option of using a conventional remote control, without a category selector, to effect the principles of this invention. A channel selector 110 in this embodiment of the invention creates lists of predefined categories, and also creates a profile of categories of interest to the user. When the user first communicates an increment command, the channel selector 110 selects the list that has the highest likelihood of being desired by the user, based upon the user's profile, as the selected list, and the first entry in that list is provided to the appliance 150 as the selected channel. After all the entries in that list are provided in response to subsequent increment commands, the list that has the second highest likelihood of being desired by the user becomes the selected list 261, and the process continues. For example, if the user's profile indicates that the user rarely, if ever, watches sports programs, the sports category list will be the last list that the channel selector 110 selects as the selected list 161. In this manner, channels that are currently broadcasting programs that are deemed to be of little interest to the user are, effectively, skipped over during the user's initial channel scans. In this embodiment, after a predetermined period of inactivity from the remote control 100, or the explicit selection of a channel number via the remote control 100, the selected list is automatically reset to the list with the highest likelihood of interest. Also in this embodiment, channel numbers that appear in multiple lists are only selected once, during the processing of the first selected list in which they appear.

The user profile may also include time-dependent information. For example, in a preferred embodiment, the user profile indicates the categories of interest to the user at different times of day during the week, and at different times of day on Saturday and Sunday. For example, a user profile may indicate, based on expressed or implied user preferences, that the user prefers news broadcasts in the early and late evening, entertainment programs at most other times, and sports programs on Sunday afternoon. In response to this profile, the order of programs presented in response to an increment or decrement command will differ at different times and on different days.

Figure 4:
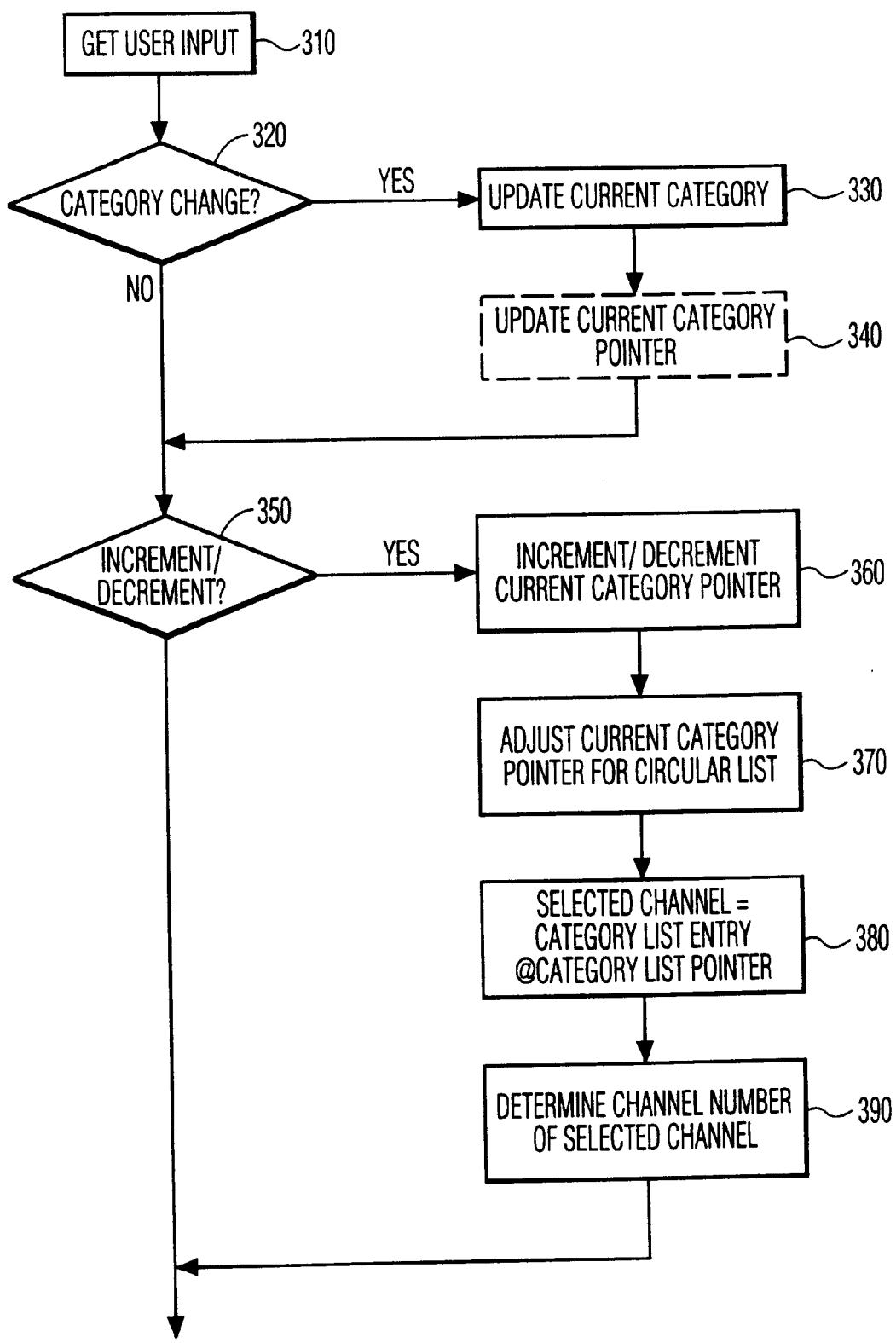
FIG. 4 illustrates an example flowchart for a program selection system in accordance with this invention.

FIG. 4 illustrates an example flowchart for an incremental program selection system in accordance with this invention. This flowchart may form a portion of the flowchart used to process input from the user, at 310, to effect the appropriate control function. If, at 320, the user's input is a category change, the current category is set to the selected category, at 330. A current category list pointer is used to identify the current entry in the currently selected category list. In a preferred embodiment, each category list has an associated list pointer, and the list pointer of the currently selected category list is used as the current category list pointer. By maintaining a separate pointer to each list, subsequent increments or decrements to a previously selected category will be relative to the previously selected program in that category. In this preferred embodiment, each category list pointer is reset to an initial state after a predetermined period of category selection inactivity. In a less costly embodiment, a single current category list pointer may be employed, and block 340 can be eliminated.

If the user input is an increment command, at 350, the current category list pointer is incremented, at 360. That is, in accordance with this invention, the current channel number is not incremented, as with a conventional increment command, but rather, the current category list pointer is incremented. As noted above, a decrement command is similarly processed. The category lists will vary in size, depending upon the number of programs currently available within each category. Block 370 adjusts the current category list pointer to provide a continuous circular list effect. That is, if the current category list pointer points beyond the end of the current entries in the current list, the current list pointer is set to the beginning of the current list; similarly, if the current category list pointer is decremented beyond the beginning of the current list, it is set to the end of the current entries in the current list.

The selected channel number is determined by accessing the entry that is indicated by the current category list pointer in the current category list, at 380. This channel number is communicated to the appliance, at 390. As discussed above, when the channel number is communicated to the appliance, any ancillary information, such as the title of the program, is also communicated to the appliance or remote control for display to the user.

Figure 5:
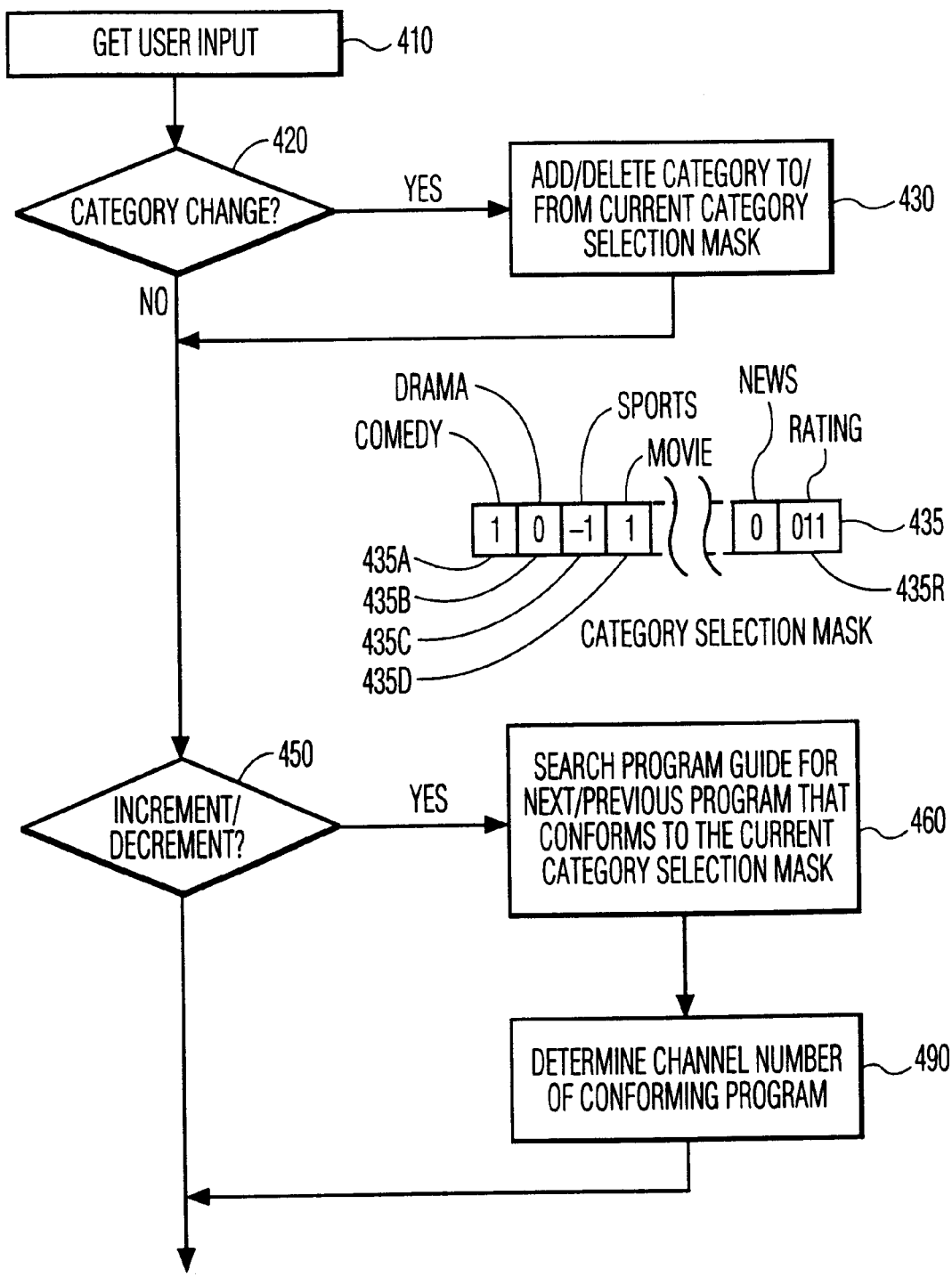
FIG. 5 illustrates an example alternative flowchart for a program selection system in accordance with this invention.

In the example flowchart of FIG. 4, the selected category 261 is presented as being a selection from existing lists 251, 252, . . . FIG. 5 illustrates an example flowchart for an alternative embodiment, wherein the selection of a channel from all of the available channel occurs each time the user effects a program increment command. In this example embodiment, a category selection mask 435 is used to contain the user's category selections. The first field 435A of the mask 435 is illustrated as representing the comedy category; the second field 435B represents drama; and so on. In this example representation of 435A–435D, a 0 represents a non-selection; a 1 represents a selection; and a –1 represents an exclusion. That is, the values of the example mask 435 indicate that the user desires to choose among any comedy programs 435A or any movies 435D, but not if they are related to sports 435C. Because drama 435B is neither selected nor excluded, a dramatic movie would be included; a sports movie, on the other hand, would be excluded. The rating field 435R is an example of a category that uses a multi-bit field to encode a choice among multiple options. For example, the encoding 011 may represent G and PG ratings, but no violence; other encodings represent other options related to program ratings. In a preferred embodiment, a menu is provided to determine the user's rating preferences and exclusions, and a table lookup is used to determine the appropriate mask encoding 435R. In a preferred embodiment, the rating mask 435R has priority over all other masks, such that a program that otherwise satisfies the user's request, but not the rating criteria, is not included as a selected program.

In FIG. 5, the user input is received at 410; if the input is a category change, at 420, the category selection mask 435 is updated, at 430. If the user input is an increment command, at 450, a program guide is searched 460 for the next or prior program that conforms to the selection criteria that is encoded in the current category selection mask, as discussed above, and its channel number is determined, at 490. Not shown, a current pointer to the program guide is maintained, and the search 460 is initiated from the current pointer. In a preferred embodiment, the search of the program guide is limited to a time span relative to the current time of day and the pointer effects a circular list, as discussed with regard to FIG. 4, within the given time span. Upon determination of the channel number, the channel selector 110 of FIG. 1 effects the appropriate operations to change the appliance 150 to the determined channel number. As would be evident to one of ordinary skill in the art, the dynamic search through a list containing multiple categories for entries that conform to a given category mask is functionally equivalent to having formed a separate list of only the entries that conform to the given category mask and selecting an entry from that separate list. The features presented herein regarding the use of explicit category lists will therefore be recognized by one of ordinary skill in the art to be applicable to the use of a single list, such as a program guide, and an appropriate category masking process.

Figure 6:
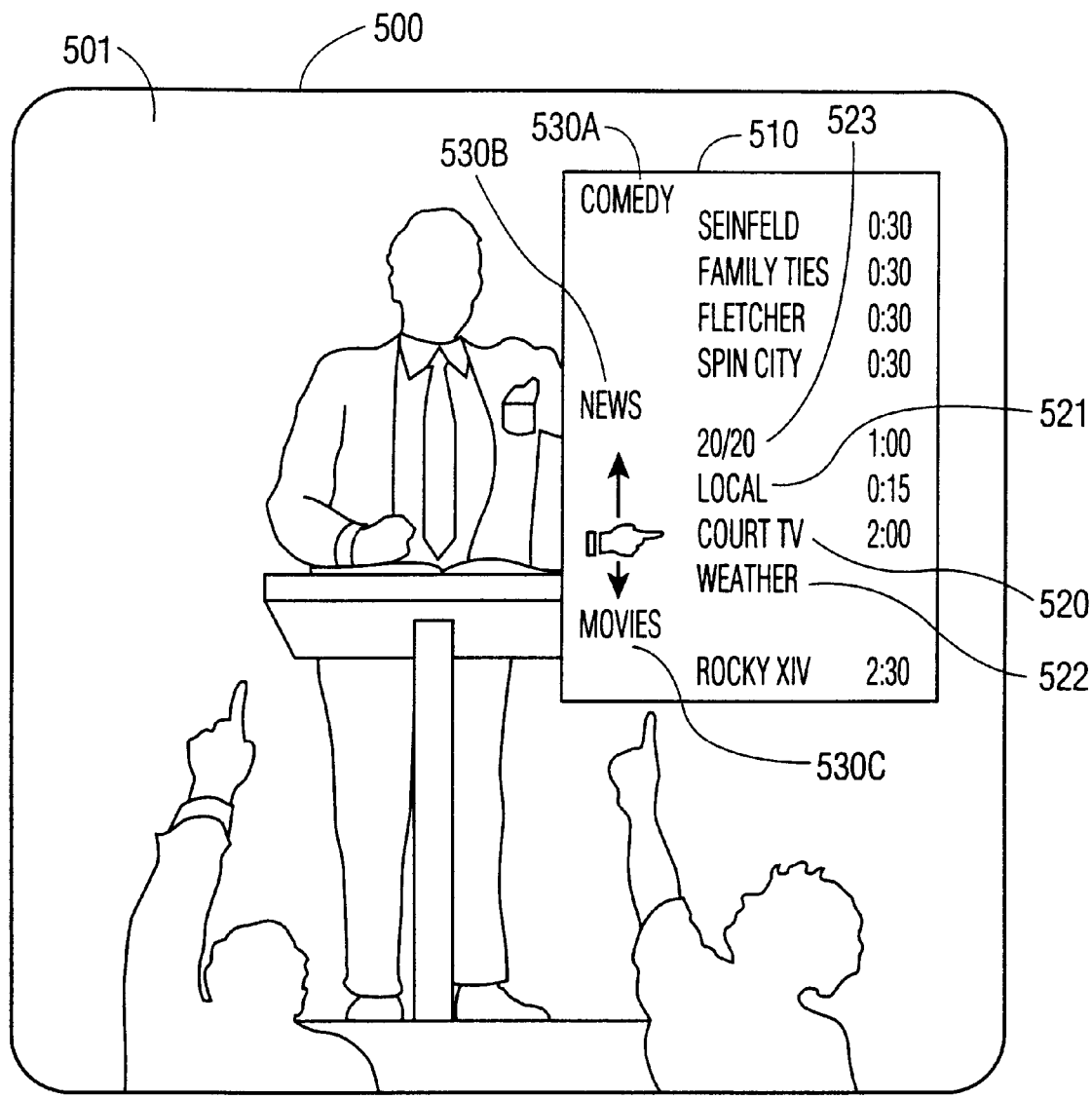
FIG. 6 illustrates an example display of program information in a program selection system in accordance with this invention.
Figure 7:
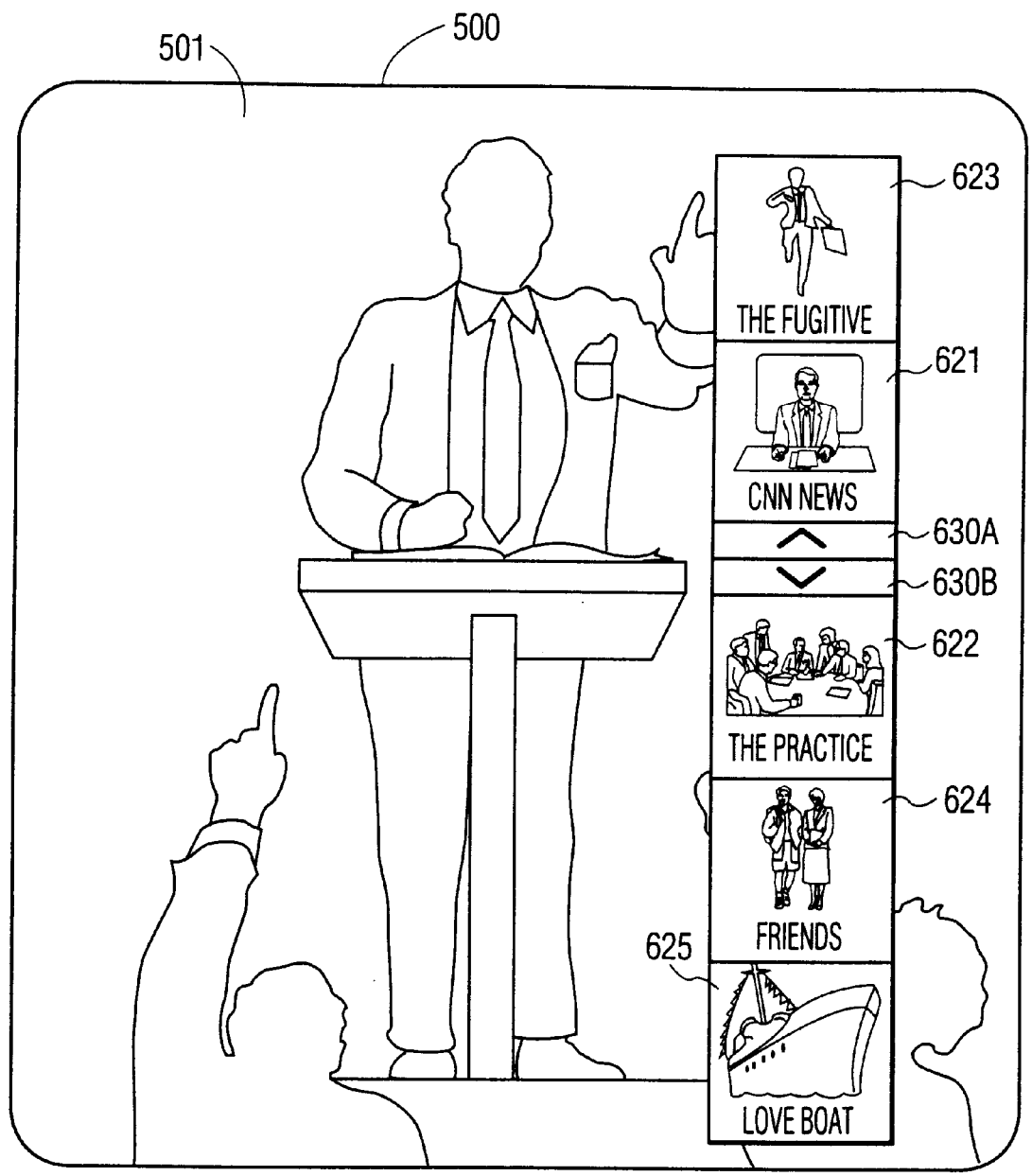
FIG. 7 illustrates an example alternative display of program information in a program selection system in accordance with this invention.

As discussed above, the use of this remote device can be further enhanced by providing on-screen information and feedback. FIGS. 6 and 7 illustrate example on-screen displays that provide the user with "look ahead" program selection capabilities. That is, the user is provided information about the program that will be selected in response to a program increment command. Depending upon the available display space, a longer-term view can be provided, indicating the programs that will be selected in response to multiple program increment commands, or category change commands.

FIG. 6 illustrates an example text-based display in accordance with this invention. Illustrated in FIG. 6 is a display 500 that is displaying a primary image 501. When the user activates the remote device 100 to effect a program or category change, a text window 510, or picture-in-picture, appears on the display 500. In accordance with this invention, the window 510 contains an indication of the programs 521 and 522 that will be selected in response to a program increment or program decrement command, respectively. Also included in this window 510 is an indication of the program 520 corresponding to the primary image 501, and other programs 523 within the currently selected category 530B. Provided that sufficient display space is available, other categories 530A, 530C and corresponding programs are also displayed. In a preferred embodiment, the selection of other categories to display is based on the aforementioned user preferences, user history, and the like. The displayed program information 520–523 includes the program name and, depending upon available display space, may include its duration, rating, episode title, a synopsis, recommendations, and so on. In a preferred embodiment, the window 510 includes the programs that are currently available, as well as those that will be available within a predetermined time interval, typically 5 minutes. The future programs are illustrated with a marking that distinguishes them from current programs. In this manner, for example, if the user is accessing the system at three minutes before the hour, the programs that will be starting on the hour will be provided as an selection option, as well as those that are currently in progress. In another preferred embodiment, the program information 520 contains links, such as hyper-links, that allow the user to access additional information about the programs, via, for example, the Internet.

Note that when the user selects the aforementioned "all" category, or resets the category selections, the window 510 is provided all available and soon to be available programs that conform to the ratings selection, if any. The programs presented in the window 510 may be presented in user preference order, in a numerical channel order, in a random order, or in any other order. If the programs are presented in a numerical channel order, this aspect of the invention can be utilized via a conventional remote control device having the conventional channel increment and decrement functions. In an alternative embodiment of this aspect of the invention, the program information 520–523 includes the program channel number, thereby also allowing for channel selection via the numeric keys, regardless of the functional capabilities of the channel up and channel down buttons.

FIG. 7 illustrates another example embodiment of an on-screen display in accordance with this invention. The embodiment of FIG.7 includes all of the functional capabilities of the embodiment of FIG. 6, but presents the information in pictorial form. In accordance with this aspect of the invention, images 621, 622 are presented, representing the programs that will be selected in response to a program increment or decrement command respectively, illustrated by the arrows 630A, 630B. Depending upon the available display space, other images 623–625 may also be provided. These images 621–625, correspond to the program entries in the selected list 261 of FIG. 3, or to the programs that conform to the category selection mask 435 of FIG. 5. The use of images, as well as program names, allows for a more immediate recognition of the available alternatives, eliminating the reliance on program name recognition that is essential in conventional channel selection devices. As in FIG. 6, if sufficient display room is available, images corresponding to other categories may also be presented. The images 621–625 may be still or motion images. The still images may be, for example, a key frame selected from a current or prior broadcast of the program, or an image that is provided by the provider of the program or the provider of the program guide. The motion images may be, for example, live feeds from programs that are currently available, or the "coming attractions" clips typically used to advertise the program.

Although the text window area 510 and image window area 610 are illustrated in FIGS. 6 and 7 as overlaying the primary image 501, alternative display means would be evident to one of ordinary skill in the art. For example, the size of the primary image 501 can be reduced, and the images or text provided in banners about the perimeter of the display 500. These banners may be animated, interactive, or static, and may include text, video, or audio information and links to other information or displays. In a preferred embodiment, the size, content, and placement of the banners about the display area 500 is controllable by the user.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the remote control 100 in accordance with this invention can be configured as a "parental control" device. In such an embodiment, the category selection control 105 is configured to have limited access, such as via a key switch. The person having the key can select "G-rated" as the selected category, for example, then provide the remote control 100 to a child, without the key. An alternative of this embodiment is the use of two remote control devices, one that contains the category selection control 105, and another that only contains the increment control 101. A parent uses the remote having the category selection control 105 to limit the programs that can be selected, places that remote in a secure place, and provides the other remote, with the increment control only, to the child. Other access limiting techniques would be readily apparent to one of ordinary skill in the art, such as the placement of the selection control 105 behind a "child-proof" cover or cap. In the example embodiment discussed above that uses an onscreen menu for selection control, a password protection scheme may be employed to preclude an unauthorized modification to the selected category or categories.

The embodiments detailed herein are presented as exemplary embodiments, and are not intended to limit the scope of this invention. For example, the conventional channel up/down switch has been illustrated as being used to effect the up/down program selection. In an alternative embodiment, the channel up/down switch retains its conventional function, and one or more additional switches are provided to effect the incremental program selection. The principles of this invention may be embodied in hardware, software, or a combination of both. For example, the list builder function may be embodied as a software program, while the category selection and channel switch functions may be embodied as a hardware device. Such architectural choices and alternative embodiments will be evident to one of ordinary skill in the art.

We claim:

1. A remote control system comprising:
    a remote control having a category selector for selecting a selected category from a plurality of categories, and an increment control for communicating an increment command;
    means for receiving a plurality of program entries from an information source, each of said program entries including a program identification, a program category and a program channel;
    a list builder for creating a plurality of category lists corresponding to said plurality of categories, each category list including program entries of said plurality of program entries based on the program category of each program entry; and
    a channel selector, operably coupled to the remote control, for, in response to the increment control, accessing one category list of said plurality of category lists corresponding to the selected category, determining a next program entry from the program entries in said one category list, and determining a channel number based on the program channel of said next program entry.

2. The remote control system as claimed in claim 1, wherein said remote control system further comprises:
    a user preference device for containing one or more user preferences, and wherein
        the list builder creates at least one category list of the plurality of category lists in further dependence upon the one or more user preferences.

3. The remote control system as claimed in claim 2, wherein the one or more user preferences are based upon a history of prior program selections.

4. The remote control system as claimed in claim 1, wherein the remote control system further comprises:
    a display device for displaying the program identification associated with the next program entry.

5. The remote control system as claimed in claim 1, wherein the remote control system further comprises:
    a display device for displaying the program identification associated with one or more program entries of the one category list.

6. The remote control system as claimed in claim 5, wherein the program identification includes at least one of: a text entry, an image, a video segment, an animation, and a link to other information.

7. The remote control system as claimed in claim 6, wherein each program entry further includes a program time interval, and the display device displays the program identification in dependence upon the program time interval.

8. A program selection system comprising:
    a display device for displaying a plurality of program information items, each including a program identification, one or more associated program categories, and a program channel, said program information items corresponding, respectively, to a plurality of programs;
    a control device, operably coupled to the display device, having a selector for selecting one of said program categories, means for causing the display device to display the plurality of program information items in dependence on the one program category, and means for indicating a select program corresponding to one of the plurality of program information items in said one program category; and
    a channel determinator, operably coupled to the control device, for determining a select channel number from the program number corresponding to the select program.

9. The program selection system as claimed in claim 8, wherein the program identification includes at least one of: a text entry, an image, a video segment, an animation, and a link to other information.

10. The program selection system as claimed in claim 8, wherein said program selection system further comprises:

a user preference device for containing one or more user preferences, and wherein
 the display device displays the plurality of program information items in further dependence upon the one or more user preferences.

11. The program selection system as claimed in claim 10, wherein the one or more user preferences are based upon a history of prior program selections.

12. The program selection system as claimed in claim 8, further including:
 an appliance, operably coupled to the channel determinator, for receiving the select channel number from the channel determinator, and for providing an output in dependence upon the channel number.

13. The program selection system as claimed in claim 8, wherein:
 each of the plurality of program information items include an associated program time interval, and
 the display device displays the plurality of program information items in dependence upon the program time interval associated with each of the plurality of information items.

14. A method for incrementally scanning programs comprising the steps:
 selecting a select category from a plurality of categories;
 creating a category list associated with each category of the plurality of categories, wherein the category list includes a plurality of program entries corresponding to the associated category, each of said plurality of program entries including a program identification and a program channel;
 receiving an increment command from a user; and
 determining, in response to the increment command, a next program entry of the plurality of program entries associated with the select category, and determining, from the program channel, a channel number associated with the next program entry.

15. The method as claimed in claim 14, where in said method further comprises the step:
 identifying one or more user preferences, and wherein the step of creating the category list of at least one category is further dependent upon the one or more user preferences.

16. The method as claimed in claim 15, wherein the step of identifying the one or more user preferences includes creating a history of user selections, and identifying the one or more user preferences in dependence upon the history of user selections.

17. A method of incrementally scanning programs comprising the steps:
 receiving a plurality of program entries based upon program information received from an information source, each program entry including a program identification, a program category and a program channel;
 selecting a select category from a plurality of categories;
 receiving an increment command from a user;
 determining, in response to the increment command, a next program entry of the plurality of program entries in which there is a correspondence between the select category and the program category associated with the next program entry; and
 determining a channel number based on the program channel associated with the next program entry.

18. The method as claimed in claim 17, wherein each program entry includes ancillary information, and said method further comprises the step:
 displaying ancillary information from the next program entry.

19. The method as claimed in claim 17, each program entry includes ancillary information, and wherein said method further comprises the step:
 displaying ancillary information associated with one or more of the plurality of program entries.

20. The method as claimed in claim 19, wherein the ancillary information includes at least one of: a text entry, an image, a video segment, an animation, and a link to other information.

21. The method as claimed in claim 20, wherein:
 each program entry includes a program time interval, and
 the step of displaying the ancillary information is based upon the program time interval associated with the one or more of the plurality of program entries.

* * * * *